United States Patent [19]

Crawford

[11] Patent Number: 5,472,654
[45] Date of Patent: Dec. 5, 1995

[54] CUTTING/SINGEING APPARATUS

[76] Inventor: Margaret A. Crawford, 2505 N. Davis St., Pensacola, Fla. 32503

[21] Appl. No.: 258,718

[22] Filed: Jun. 13, 1994

[51] Int. Cl.⁶ .................................................... A45D 26/00
[52] U.S. Cl. ........................ 264/163; 132/201; 219/223; 219/225; 219/227; 264/168; 264/282; 425/298; 425/318; 425/394
[58] Field of Search ..................................... 264/138, 152, 264/145, 163, 168, 282; 425/394, 143, 318, 298, 299; 132/201, 206, 207, 213, 214; 219/223, 225, 227

[56] References Cited

U.S. PATENT DOCUMENTS

| 2,032,688 | 3/1936 | Dart | 219/227 |
|---|---|---|---|
| 3,031,561 | 4/1962 | Shaffer | 425/318 |
| 3,474,224 | 10/1969 | Carter . | |
| 4,046,148 | 9/1977 | Meador | 219/227 |
| 4,254,324 | 3/1981 | Vrtaric | 219/223 |
| 4,982,748 | 1/1991 | Trimarchi | 132/201 |
| 5,064,993 | 11/1991 | Hashimoto | 219/223 |
| 5,121,761 | 6/1992 | Meister | 132/201 |
| 5,309,640 | 5/1994 | Carson | 219/227 |

FOREIGN PATENT DOCUMENTS

| 2532878 | 3/1984 | France | 219/223 |
|---|---|---|---|
| 680763 | 9/1939 | Germany | 219/223 |

Primary Examiner—Timothy M. McMahon
Attorney, Agent, or Firm—George A. Bode; Michael L. Hoelter

[57] ABSTRACT

A manually operable device that is used to cut a synthetic material and also singe the end of this newly cut material to prevent it from unravelling. This tool incorporates a separate crimping assembly, cutting assembly, and burning assembly for each of these steps. The crimping assembly holds the material in place during the cutting and burning stages and also aids in fusing the melted ends of the material into a uniform mass. The cutting assembly cuts the material where desired, trims any stray fibers from the cut and/or fused end, and also removes any excess burn from this fused end. The burning assembly, connected to a reservoir, burns a flammable fluid so as to burn or singe the material placed thereover.

12 Claims, 7 Drawing Sheets

CUTTING/SINGEING APPARATUS

BACKGROUND OF THE INVENTION

1. Field of the Invention

This invention pertains in general to a tool which can both cut and singe a synthetic material placed therein and more particularly to a personal grooming device for use in cutting/singeing hair-like synthetic fibers which have previously been braided.

2. General Background

Humans have been braiding hair for as long as can be remembered. These braids can take a variety of forms or shapes ranging from new styles worn by celebrities to older traditional "cornrows" that are a part of the human heritage.

Additionally, it is quite common for a person to supplement their own natural hair with strands of synthetic fiber formed to look like human hair. These synthetic fibers are braided into the natural hair for a gradual transition from the one to the other. In this fashion, the person can effectively increase their hair length so as to partake in many more hair styles.

Currently, braiding synthetic hair involves the process of cutting the fibers and then burning or singeing these newly cut ends to prevent the synthetic strands from unravelling. Generally, the hairdresser will employ scissors and a cigarette lighter to accomplish this, with the hairdresser constantly switching between the two while simultaneously attempting to maintain a firm grasp on the braided fibers. In addition to these awkward gyrations, the hairdresser must also immediately crimp the newly burnt hair while it is still in its molten form. This is most often done with the bare fingers which causes blistering. Should the customer desire a large number of cornrows or should the hairdresser perform this service over a long period of time, the blistering to the hairdresser's fingers can be quite severe.

In addition to hairdressers, other people or professions that frequently cut and singe synthetic fibers also follow a similar technique as set forth above. These people/professions also desire a safer, quicker, cleaner method of trimming such strands to length and/or cutting longer strands into multiple shorter ones. Such needs currently exist for the cutting of yarn, rope, lace, and other lengths of synthetic fabric or material.

Apparatus and methods for treating hair, both natural and synthetic, and particularly singeing and attaching synthetic extensions to natural hair are known as disclosed in U.S. Pat. Nos. 3,474,224 issued to J. F. Carter; 4,254,324 issued to J. Vrtaric; 4,982,748 issued to A. L. Trimarchi; 5,064,993 issued to K. Hashimoto; and, 5,121,761 issued to K. L. Meister.

It is thus an object of the present invention to provide a cutting/singeing device that will quickly and easily cut synthetic strands to a desired length.

Another object of this invention is to provide a single device that will hold the synthetic fibers while their ends are clipped, burnt, singed, and crimped.

Still another object of this invention is to permit a hairdresser and/or others to create more uniform braids and/or lengths of synthetic material in a shorter period of time.

A further object of this invention is to more uniformly seal or singe the cut ends for greater security, consistency, and symmetry.

Yet another object of this invention is to permit the hairdresser to create a variety of differently sized braids and to make adjustments to these braids as needed.

Still another object of this invention is to provide other professions with greater control over the creation of lengths of synthetic material such as yarn, rope, lace, and the like. These and other objects and advantages of this invention will become obvious upon further investigation.

SUMMARY OF THE PRESENT INVENTION

The preferred embodiment of the apparatus of the present invention solves the aforementioned problems in a straightforward and simple manner. What is provided is a hand tool that is configured with first and second elongated handles that are pivotally secured together at one end region thereby defining a working end adjacent this one end region. A crimping assembly forms a part of this working end with this crimping assembly configured to engage a material placed therein. Additionally, a cutting assembly having a pair of blades forms a part of this working end which cuts a material that is placed between its blades. Furthermore, a burning assembly forms a part of this tool with this burning assembly projecting into the working end so as to burn or singe a material placed within its range. This tool also incorporates various control mechanisms that control the burning assembly such that a material placed within the working end of the tool can be held in place by the crimping assembly, cut or trimmed by the cutting assembly, melted or singed by the burning assembly, fused into a uniform mass by repeated manipulations within the crimping assembly, and then trimmed again by the cutting assembly to remove any remaining stray fibers or excess burn.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
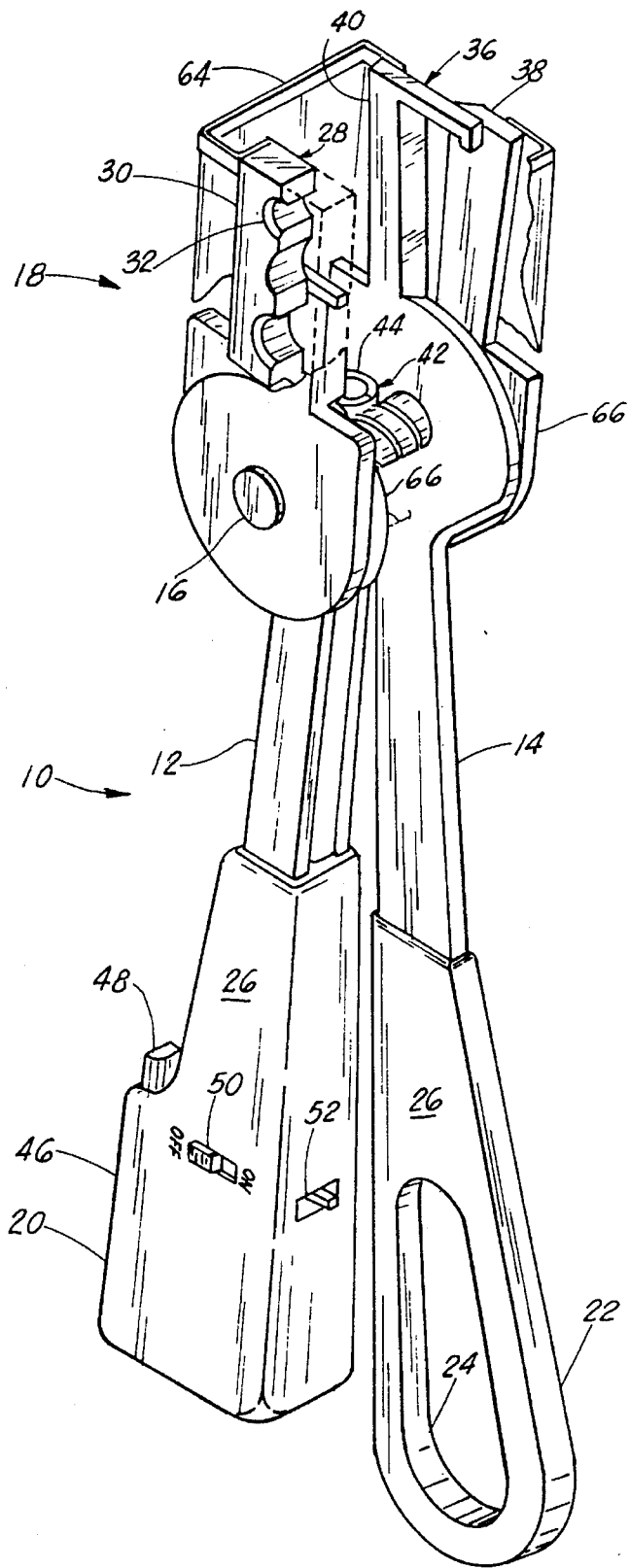
FIG. 1 is a pictorial view of the invention with a portion of crimping assembly broken away for clarity.
Figures 2, 3:
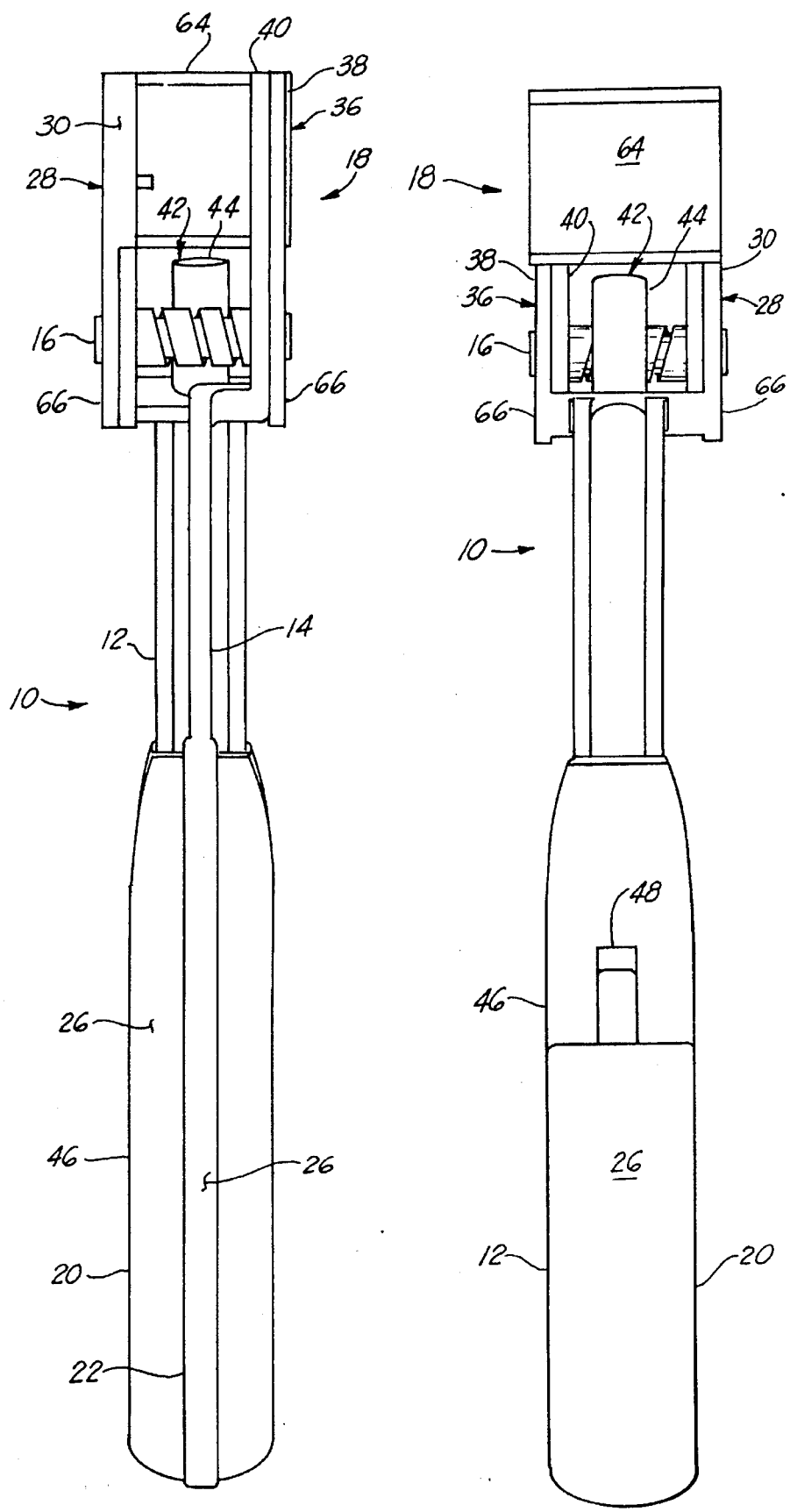
FIG. 2 is a right pictorial view of the invention.
FIG. 3 is a left pictorial view of the invention.
Figure 4:
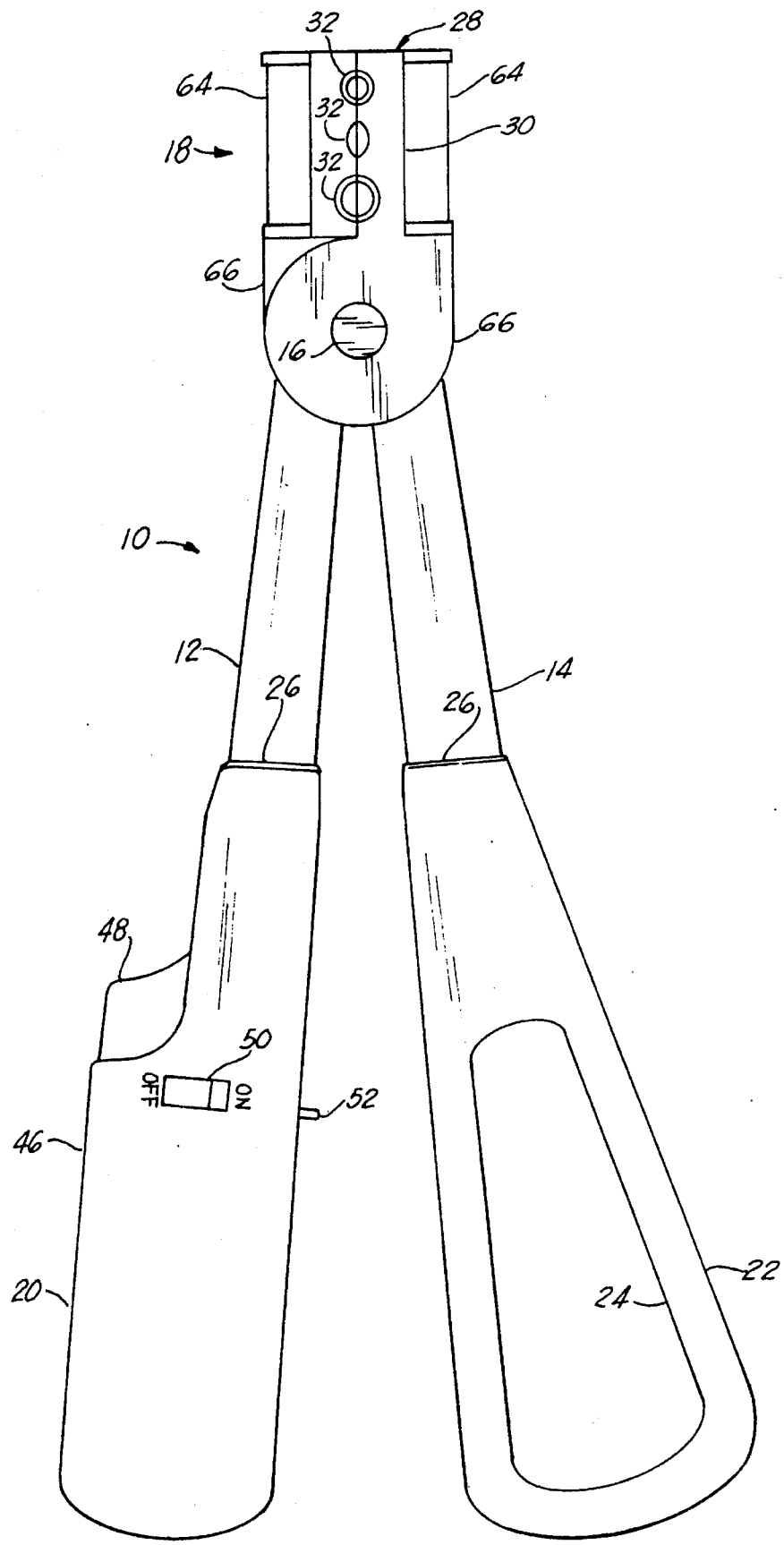
FIG. 4 is a front side pictorial view of the invention.

Referring to the drawings, there is shown cutting/singeing apparatus 10 which initially appears as a crimping device and/or a pair of scissors. In this embodiment, two elongated handles 12 and 14 are pivotally secured together such as via a hinge pin 16 to form working end 18. The opposite end regions 20 and 22, respectively, of these elongated handles 12 and 14 are generally configured to ease the grasping, holding, and utilization of tool 10 by the user. Such a configuration can take the shape of enlarged and curved end regions 20 and 22 with end region 22 generally also having an elongated opening 24 therein. Ideally, opening 24 of end region 22 is configured to accommodate the thumb of the user while adjacent end region 20 is held by the fingers of the user. Additionally, one or both of these end regions 20 and 22 can be covered by a soft flexible material 26 (such as plastic) for additional comfort during use.

Referring now to working end 18, there is best shown in FIGS. 1, 4, 8 and 9, crimping assembly 28. Crimping assembly 28 consists of two separate crimps or die 30, each a mirror image of the other and each secured to its respective handle 12 or 14. Crimps or die 30, in this embodiment, are each molded or configured with three separate vertically aligned semi-cylindrical notches 32 therein. Of course, there can be more or less of such notches 32 if so desired and their configuration can vary. The size of these notches 32 can also vary so that when the two crimps or die 30 are brought or abutted together, different sized openings through crimps or die 30 are formed by the now adjacent notches 32. Preferably, the size of these openings are selected to accommodate differently sized strands of synthetic material 34.

Figure 5:
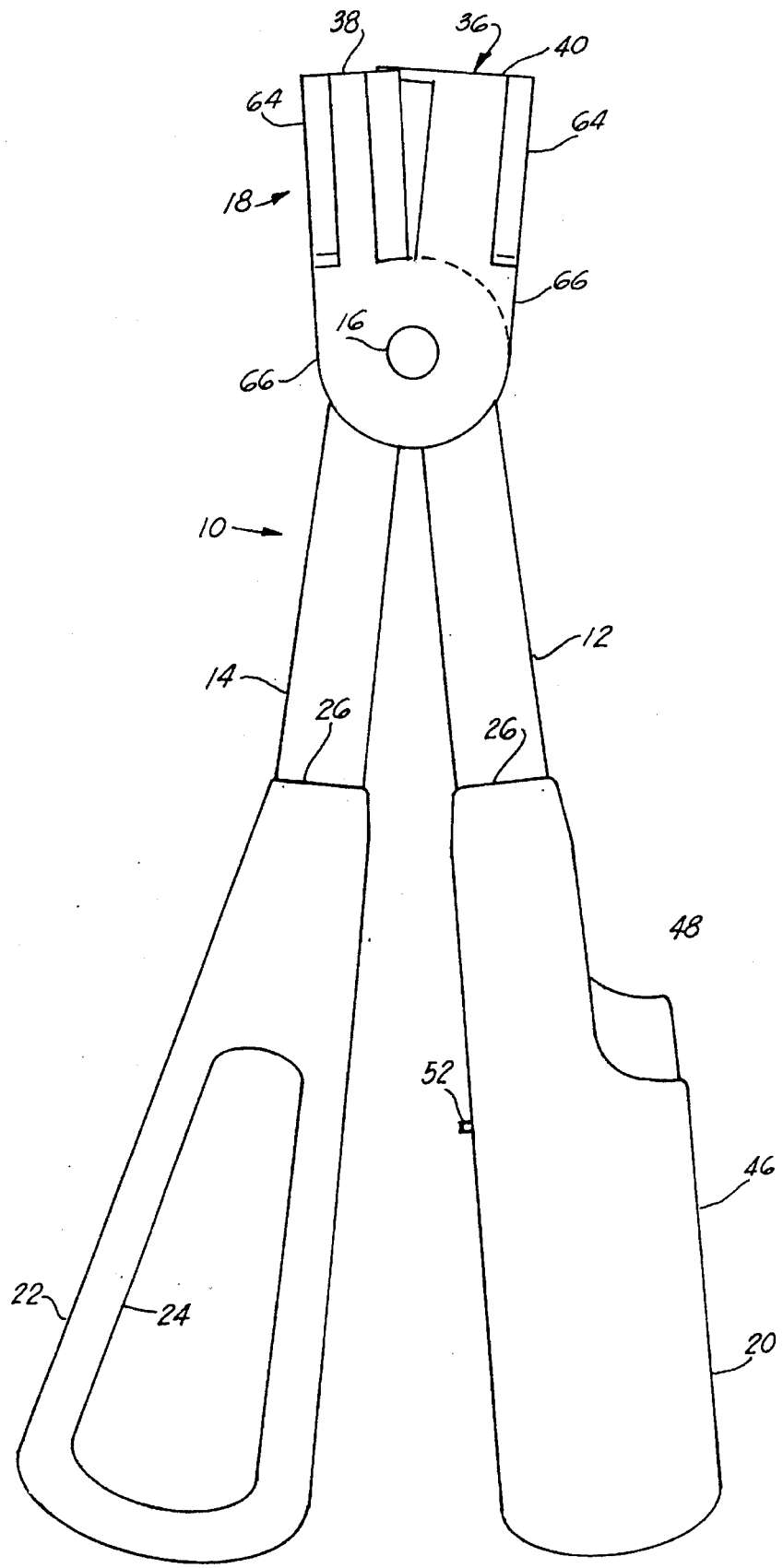
FIG. 5 is a back side pictorial view of the invention.
Figures 6, 7:
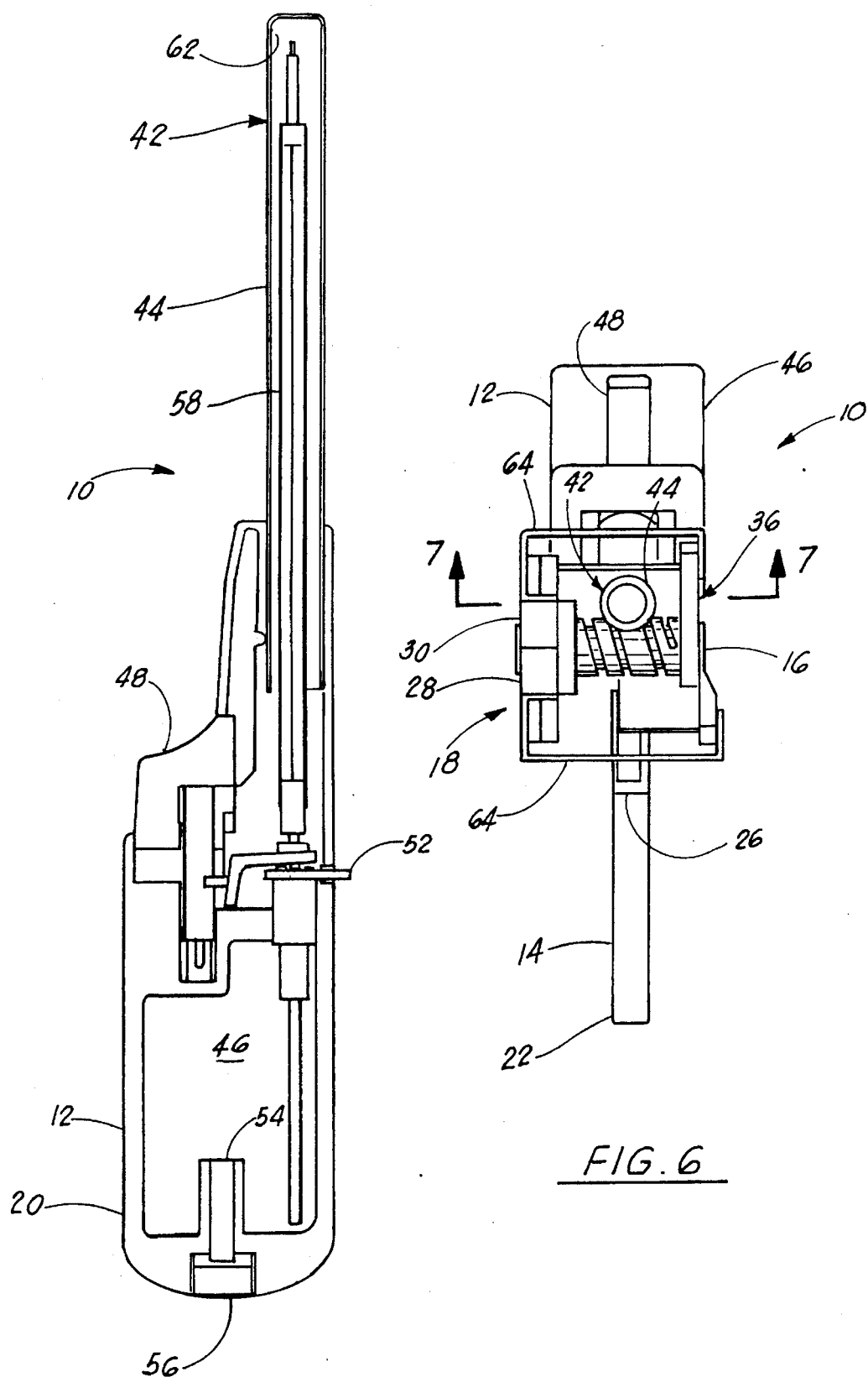
FIG. 6 is a top pictorial view of the invention.
FIG. 7 is a sectional view of the invention taken along lines 7—7 of FIG. 6 with a portion of the working end removed for clarity.
Figure 12:
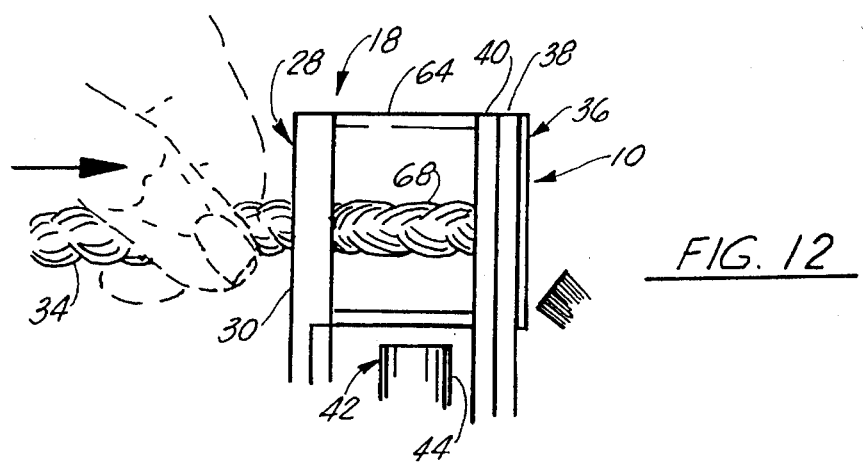

Opposite crimping assembly 28 but still adjacent hinge pin 16 and within working end 18 is cutting assembly 36, best seen in FIGS. 1, 5 and 12. Cutting assembly 36 consists of two beveled blades 38 each secured to their respective handle 12 or 14. In some embodiments, the beveled edge of blades 38 will not be co-planar or positioned opposite each other as are crimps or die 30 in crimping assembly 28. Instead, these blades 38 will be positioned slightly offset from but immediately adjacent each other so that they can overlap and slide past each other, thereby cutting as a pair of scissors. In other embodiments, however, the edges of the two beveled blades 38 are co-planer and when pivoted, will engage and/or abut each other thereby pinching material 34 between their respective beveled edges in the same manner as wire cutters. FIG. 6 illustrates yet another variation in which there is only one beveled blade 38 (in this case, secured to handle 12) and one offset cutting block 40 (in this case secured to handle 14) such that material 34 is cut as the edge of blade 38 abuts and slides past cutting block 40. In any event, no matter how beveled blades 38 are positioned, cutting assembly 36 is designed to cut material 34 that is placed within tool 10.

Intermediate crimping assembly 28 and cutting assembly 36 is burning assembly 42, all three being in the working end 18 of tool 10. Burning assembly 42, as best seen in FIGS. 1–3, 6, 7, 10 and 11 consists of an elongated cylinder 44 that terminates or ends adjacent hinge pin 16 but underneath both crimping assembly 28 and cutting assembly 36. In some cases, a wire or mesh screen (not shown) can be incorporated to prevent objects from falling within cylinder 44. Cylinder 44 forms a part of handle 12 with end region 20 thereof consisting primarily of a reservoir 46 for storing the flammable fluid (such as butane) to be burned in burning assembly 42. This flammable fluid passes from reservoir 46 to working end 18 through cylinder 44. End region 20 of handle 12 also contains the operating mechanisms for burning assembly 42, such as ignitor button 48, on-off switch 50, and flame height adjustment control 52. These mechanisms 48, 50, and 52 are preferably configured for operation by the index finger of the user.

FIG. 7 illustrates the preferred embodiment of the internal parts and configuration of tool 10. Other configurations and parts may also be employed, depending on manufacturing and operating needs. In this embodiment, the flammable fluid in reservoir 46 can be refilled and/or drained via port 54 which is sealed by removable plug 56. During use, the flammable fluid will pass upward through tube 58 in cylinder 44 until ignited by either an existing flame 60 or ignitor 62 at the end of cylinder 44. As can be surmised, ignitor 62 is operated by ignitor button 48 and the amount of flammable fluid passing upward through tube 58 (and hence the height of flame 60) is controlled by flame height adjustment control 52. Ignitor 62 may be either mechanically (flint) or electrically (spark) operated to ignite the flammable fluid, depending upon design choice.

As best seen in FIGS. 2–6 and 8 and 9, brackets and sliding plates 64 and 66 secure the respective parts of crimping assembly 28 and cutting assembly 36 to their respective handles 12 and 14. Sliding plates 66 pivot with respect to each other about hinge pin 16 in the conventional manner.

Figure 8:
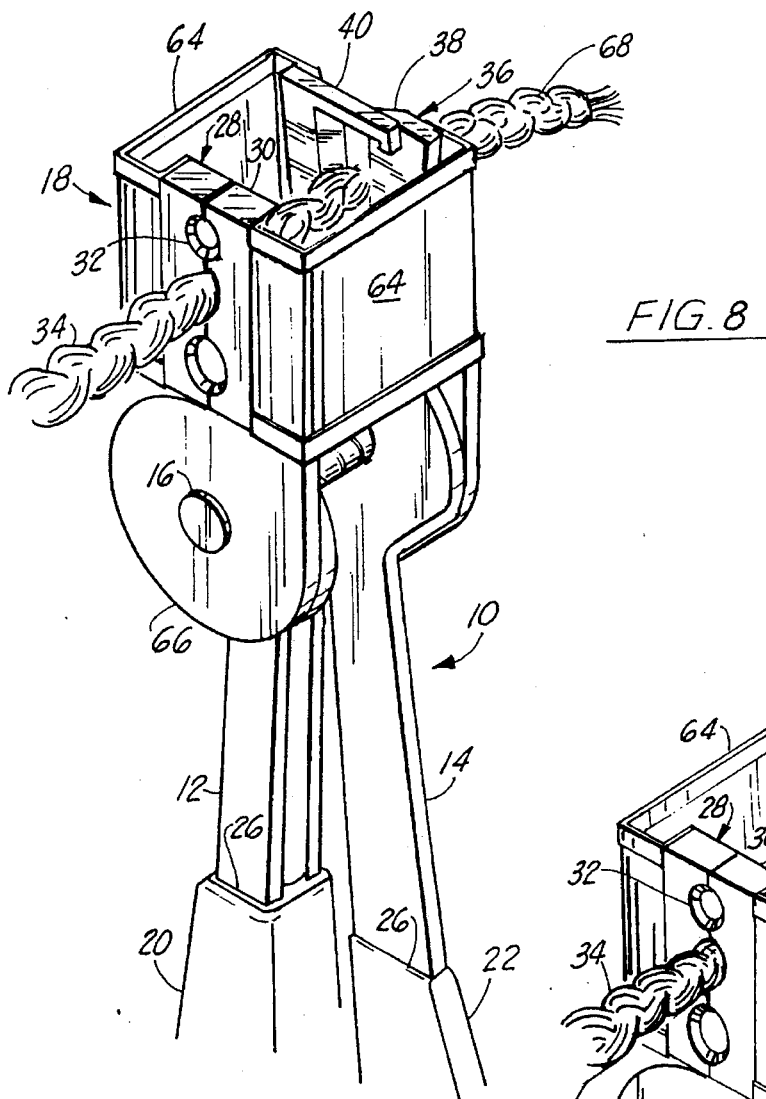
FIG. 8 is a pictorial view of the invention, partially cut away, illustrating the initial crimping of a braided strand of synthetic fiber.
Figure 9:
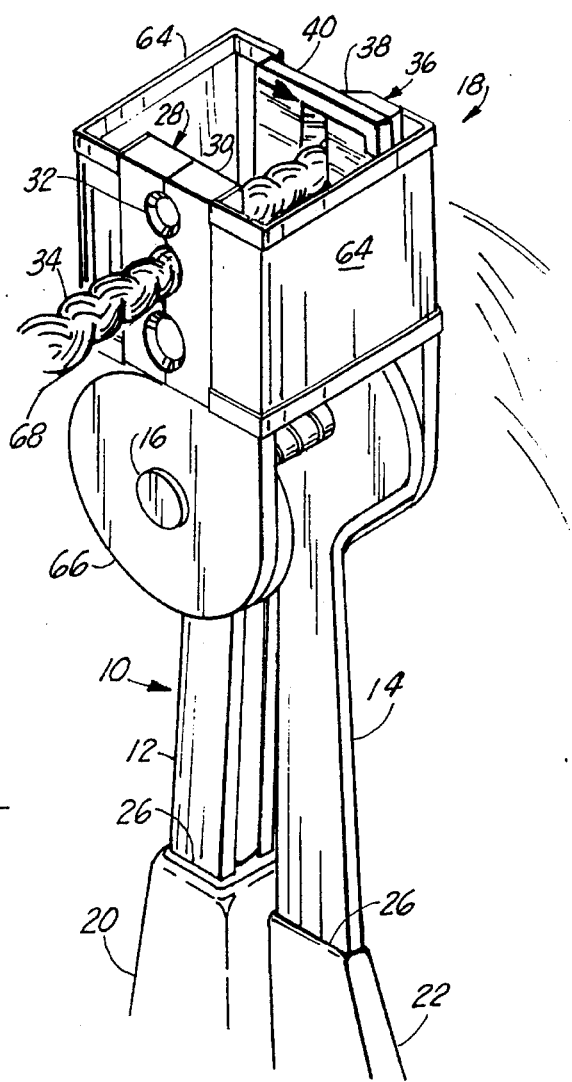
FIG. 9 is a pictorial view of the invention, partially cut away, illustrating the cutting of a braided strand of synthetic fibers.
Figure 10:
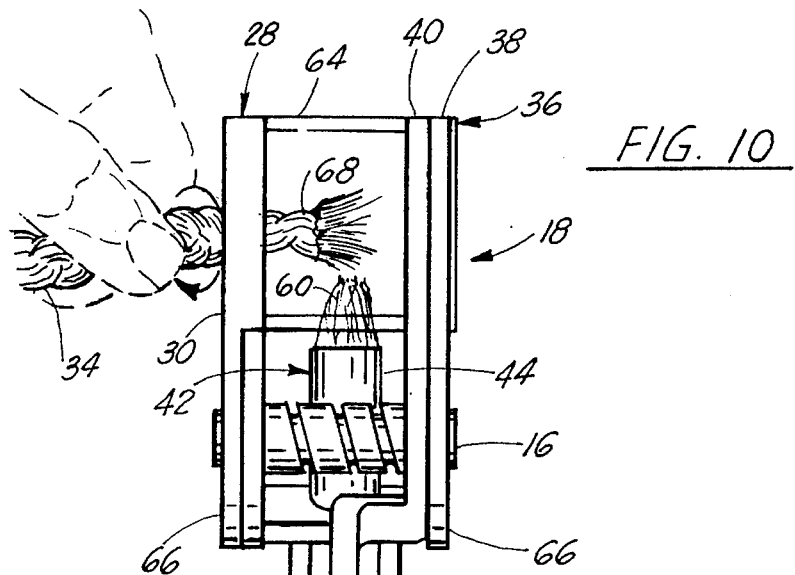
FIGS. 10 and 11 are right side pictorial views of the invention, partially cut away, illustrating the burning or singeing of synthetic fibers; and, FIG. 12 is a right side pictorial view of the invention, partially cut away, illustrating the cutting of any stray fibers or excess burn from the fused end of a braid.
Figure 11:
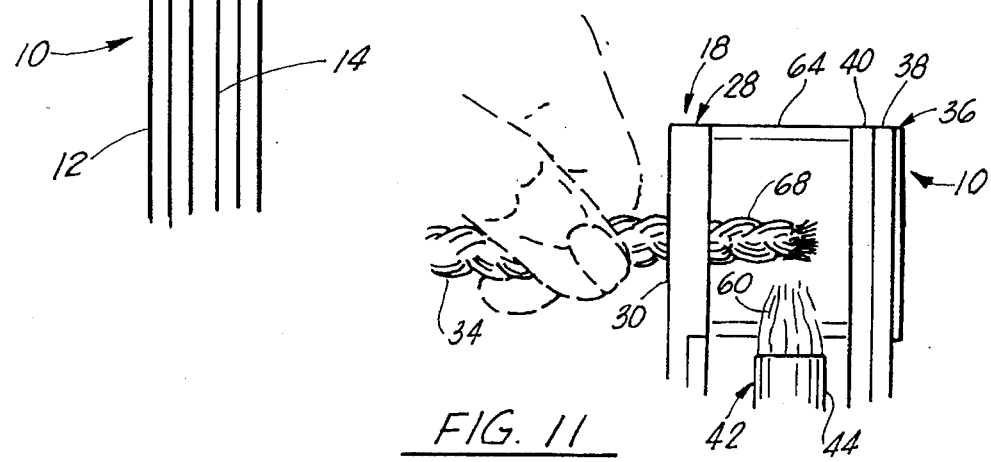

The operation of braided hair tool 10 is illustrated in FIGS. 8–12. Initially, the end of a strand of material 34, such as a length of braided synthetic hair 68, is inserted within the working end 18 of tool 10 as shown in FIG. 8. This braid 68 is to be positioned or inserted within, preferably, the middle or universal pair of notches 32 of crimping assembly 28 and extend across cutting assembly 36. A first or initial closing of tool 10 will grab or clamp this braid 68 in crimping assembly 28 via universal notches 32 thereby further supporting braid 68 within tool 10. A second, harder or a continual closing of handles 12 and 14 will cause blades 38 of cutting assembly 36 to cut or sever the end of braid 68 extending beyond cutting assembly 36 as shown in FIG. 9. Afterwards, braid 68 is withdrawn slightly from working end 18 so that these newly cut or severed ends of synthetic braid 68 are positioned over cylinder 44. Ignitor button 48 is then operated (after on-off switch 50 is moved to the "on" position) to ignite the flammable fluid passing through channel 44. The resulting flame 60 coming from cylinder 44 thereby burns or singes these newly cut fibers as shown in FIGS. 10 and 11. As stated earlier, the height or intensity of flame 60 can be controlled via adjustment control 52. While these singed ends are still in their molten state, braid 68 is slightly pulled back or withdrawn a second time from working end 18 so as to now position the melted ends of braid 68 within either upper or lower notches 32 (depending on size) of crimping assembly 28. Braid 68 is then manipulated back and forth and round and round within the selected notch 32 while simultaneously opening and closing handles 12 and 14 so as to crimp and thereby cause all these molted ends to fuse together into a solid mass of uniform configuration. Cutting assembly 36 can then be employed again (FIG. 12) to trim away any stray fibers or excess burn from braid 68.

While the above description of tool 10 has been with respect to synthetic fiber strands configured in the shape of human hair, tool 10 can also be used for purposes other than personal grooming. Examples of such other uses include the cutting and singeing of yarn, rope, lace or other elongated synthetic fabric pieces for such purposes as sewing, arts and crafts, or repair.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A hand tool comprising:
   (a) first and second elongated handles pivotally secured together at one end region and thereby defining a working end adjacent said one end region, wherein the end of said first and second elongated handles opposite said working end are enlarged and constructed for grasping by the user, said enlarged end of said first elongated handle opposite said working end comprising an opening constructed and arranged for the insertion therethrough of a user's finger or thumb and, said enlarged end of said second handle opposite said working end comprising reservoir means for containing or storing a flammable fluid therein;
   (b) crimping means forming a part of said working end for crimping a material placed therein, said crimping means comprising a pair of oppositely positioned crimps or die which are brought or biased together by the pivoting of said first and second elongated handles, said oppositely positioned crimps or die each being symmetrically notched and, further comprising a plurality of matching notches that are differently sized such that when said crimping means are in the closed position with said crimps or die abutting each other, differently sized openings through said crimps or die are created;
   (c) cutting means forming a part of said working end for cutting a material placed therein;
   (d) burning means projecting into said working end for burning or singeing a material placed therein; and,
   (e) control means for controlling the operation of said burning means, whereby a material placed within said working end can be sequentially crimped and held in place by said crimping means, trimmed by said cutting means, melted or singed by said burning means and fused together by repeated manipulation within said crimping means.

2. The hand tool as set forth in claim 1, wherein said plurality of crimps or die comprise a first upper said notch therein of a first size, a second middle said notch therein of a second size, and a third lower said notch therein of a third size.

3. The hand tool as set forth in claim 1, further comprising channel means extending intermediate said working end and said reservoir for the controlled delivery of said flammable fluid to said working end.

4. The hand tool as set forth in claim 3, wherein said control means comprise on-off, ignitor, and flame height control mechanisms secured adjacent said reservoir.

5. The hand tool as set forth in claim 4, further comprising ignitor means forming a part of said channel means adjacent said working end for igniting said flammable fluid exiting said channel means.

6. The hand tool as set forth in claim 5, further comprising a mesh screen across said channel means adjacent said working end through which said flammable fluid passes.

7. The hand tool as set forth in claim 6, wherein said cutting means comprise first and second beveled edges secured, respectively, to said first and second handles, said first and second beveled edges being positioned adjacent each other in an offset, non-co-planar relationship thereby permitting one said beveled edge to slide past the other said beveled edge.

8. The hand tool as set forth in claim 6, wherein said cutting means comprise first and second beveled edges secured, respectively, to said first and second handles, said first and second beveled edges being positioned adjacent each other in an aligned, co-planar relationship thereby abutting each other when said first and second elongated handles are pivoted towards each other.

9. The hand tool as set forth in claim 6, wherein said cutting means comprise a first beveled edge and a second cutting block secured, respectively, to said first and second handles, said first beveled edge and said second cutting block being positioned adjacent each other in an offset, non-co-planar relationship thereby permitting said beveled edge to slide past said cutting block.

10. A method of cutting and singeing a strand of synthetic material comprising the steps of:
    (a) positioning the synthetic material within a working end of a hand tool, said working end of said hand tool comprising:
       i. crimping means for crimping the material placed therein;
       ii. cutting means for cutting the material placed therein;
       iii. burning means for burning or singeing the material placed thereover; and,
       iv. control means for controlling the operation of said burning means;
    (b) crimping the material by said crimping means thereby restraining the material in place within said working end;
    (c) cutting the material extending within said cutting means;
    (d) burning or singeing the newly cut end of the material via said burning means;
    (e) controlling the operation of said burning means by said control means;
    (f) crimping the material between a pair of oppositely positioned crimps or die which are constructed with at least one pair of symmetrical notches therein; and,
    (g) containing or storing a flammable fluid within a reservoir, said reservoir forming a part of and secured to said hand tool.

11. The method as set forth in claim 10, further comprising the step of delivering said flammable fluid from said reservoir to said burning means via a channel.

12. The method as set forth in claim 11, further comprising the step of controlling the operation of said burning means via on-off, ignition, and flame height control mechanisms secured adjacent said reservoir.

* * * * *